June 29, 1965 H. BRUCHSCHMIDT 3,192,532

RECORDING INSTRUMENT

Filed May 8, 1962 3 Sheets-Sheet 1

INVENTOR
HANS BRUCHSCHMIDT
BY
[signature]
ATTORNEY.

June 29, 1965 H. BRUCHSCHMIDT 3,192,532

RECORDING INSTRUMENT

Filed May 8, 1962 3 Sheets-Sheet 2

INVENTOR
HANS BRUCHSCHMIDT
BY

ATTORNEY.

June 29, 1965 H. BRUCHSCHMIDT 3,192,532

RECORDING INSTRUMENT

Filed May 8, 1962 3 Sheets-Sheet 3

INVENTOR
HANS BRUCHSCHMIDT
BY

ATTORNEY.

United States Patent Office 3,192,532
Patented June 29, 1965

3,192,532
RECORDING INSTRUMENT

Hans Bruchschmidt, Frankfurt am Main, Germany, assignor to VDO Tachometer Werke Adolf Schindling G.m.b.H., Frankfurt am Main, Germany, a corporation of Germany Filed May 8, 1962, Ser. No. 193,104
Claims priority, application Germany, May 12, 1961, V 20,650
4 Claims. (Cl. 346—23)

The present invention relates to a recording instrument for the recording of strokes performed in cycles or numbers of manufactured pieces, etc. of working machines or the like with a time-responsive rotating diagram disk and a swingable, electromagnetically controlled recording arm for recording, the swinging movements of the recording arm being limited by abutments.

In the known recording instruments having a swingable electromagnetically operated recording arm, the recording of strokes in cycles or of numbers of pieces is performed on a diagram disk in form of radial lines of equal length starting from a circular line or from a spiral line or in form of small rectangles of equal height, which, as a rule, are disposed so close relative to each other, that their exploitation is extremely difficult and time-consuming. If now the rotary speed of the diagram disk is increased, which is possible only within certain limits, a greater distance between the recorded lines is obtained, which result simplifies the counting of the individual lines, yet necessitates, however, an exchange of the disks at shorter intervals. Another drawback, occurring on account of the increase of the rotary speed of the diagram disk, resides in the fact that due to the greater distances between the recorded lines, particularly smaller irregularities in the sequence of the strokes of the cycles and interruptions or disturbances, respectively, are more difficult to be recognized in the working process than in the more crowded recording. Thus, in particular in case of an extremely close recording line arrangement, which leads to the so-called "beam line" recording, even very slight interruptions appear immediately in form of slot-like notches.

It is, therefore, one object of the present invention to provide a recording instrument in which the advantages of the known instruments are not lost and in which simultaneously the counting of the individual recording lines is simplified.

It is another object of the present invention to provide a recording instrument wherein means are provided to amplify predetermined multiples of the individual recordings by lines of different lengths or rectangles of different heights, respectively.

It is also an object of the present invention to provide a recording instrument wherein means are provided for amplification of recordings of predetermined multiples of working cycles, numbers of manufactured pieces or the like, which means are advanced in accordance with the swinging steps of the recording arm and the position of one of the abutments for the recording arm controlling said amplification means upon reaching the predetermined multiple of the recordings.

A recording method is known already in which, for the exploitation of closely recorded lines, the individual lines producing the data are recorded in form of a zig-zag line, the peaks of which constitute a predetermined multiple of the individual recordings. The zig-zag line has, however, a relatively great space requirement on the diagram disk and the instrument for recording of the zig-zag line is spacious and accordingly expensive. Furthermore, the peaks of the zig-zag line stand merely for a predetermined multiple of the individual recordings.

It is, therefore, still another object of the present invention to provide a recording instrument wherein these drawbacks are avoided and which comprises a recording instrument with a rotating diagram disk and a swingable recording arm, the movements of which recording arm are limited for the recording of individual recordings of equal height on circular lines of different radii or on spiral lines, and which movements are limited by two abutments.

It is yet another object of the present invention to provide a recording instrument wherein one of the abutments for the recording arm is formed as a rotating disk, which can be advanced within the cycle of the swinging movements and on the periphery of which are provided notches of equal or of different depths in order to amplify predetermined recordings at regular distances.

The limit of the recording movements by the periphery of a disk, moved within the cycle of the movements of the recording arm, has the advantage that upon a corresponding arrangement and formation of the notches, selectively only predetermined, for instance, decadal multiples or a plurality of predetermined multiples of individual recordings are amplified in simple manner by means of recording lines of different lengths and by means of rectangles of different heights, respectively.

The recording mechanism, designed in accordance with the present invention, is characterized also by a very simple, robust and economical construction.

With these and other objects in view, which will become apparent in the following detailed description, the present invention will be clearly understood in connection with the accompanying drawings, in which.

Figure 1:
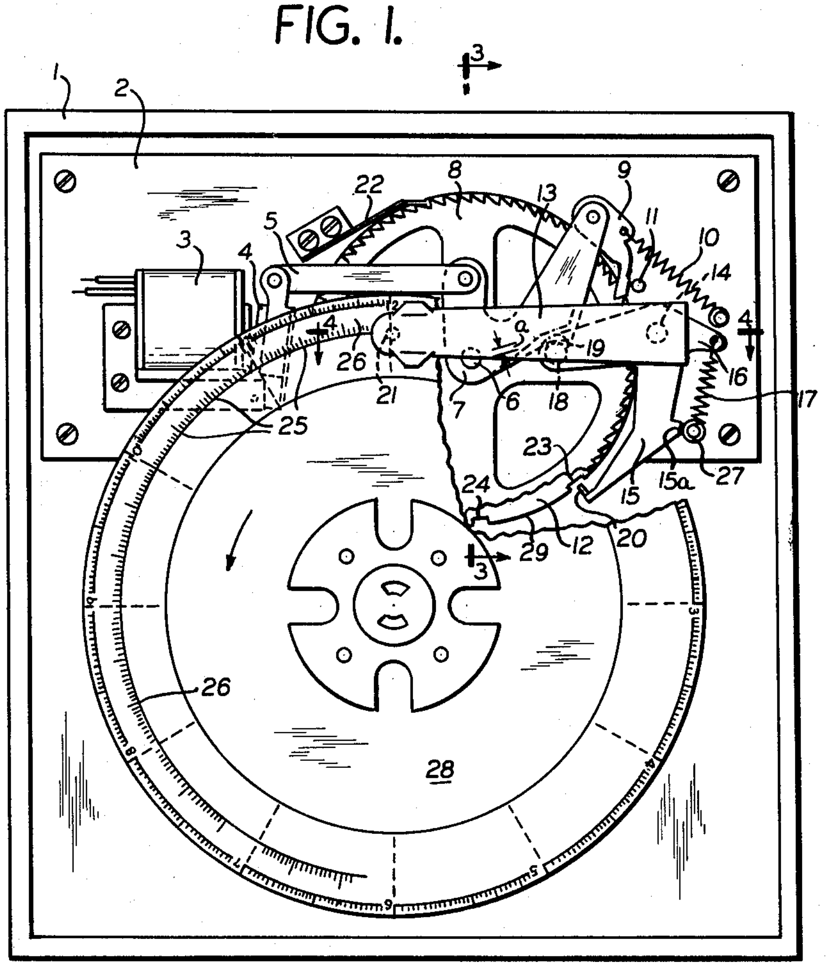
FIGURE 1 is a front elevation of the recording instrument, the electromagnet being shown in inoperative position, parts being broken away for the purpose of better demonstration.

Referring now to the drawings, the recording instrument comprises a housing 1, which can be closed by a cover (not shown), which cover has a window adapted for the observation of the diagram disk.

An electromagnet 3 which responds to strokes per working cycle, number of manufactured pieces, etc. is secured to a base plate 2, which in turn is mounted in the housing 1. A swingably disposed armature 4 of the electromagnet 3 is connected with one arm of a double-armed lever 7 by means of an intermediate member 5. The double-armed lever 7 is rigidly connected with a bushing 7*a*, which is loosely mounted on a bolt 6, which is secured to the base plate 2. A pawl 9 cooperating with a ratchet wheel 8 is disposed at the free end of the other arm of the double armed lever 7. A spring 10 attached to the pawl 9 maintains the latter in engagement with an immovable abutment 11 in the inoperative position of the electromagnet 3 and, thereby, maintains the armature 4, the intermediate member 5 and the double-armed lever 7 in the position shown in FIG. 1 of the drawings.

The ratchet wheel 8 is jointly with an abutment disk 12 mounted on a bushing *6a*, the latter being rotatably mounted on the bolt 6. The periphery of the abutment disk 12 serves as limiting means for the swinging movements of a recording arm 13. The latter is secured to a bushing 14*a* which sits loosely on a bolt 14 rigidly mounted on the base plate 2. A double-armed lever 15 is likewise secured to the bushing *14a*. A spring 17, one end of which is secured to a projection 16 of the double-armed lever 15, maintains a pin 18, projecting perpendicularly from the double-armed lever 15, in engagement with the edge formation 19 of the double-armed lever 7 during the inoperative position of the electromagnet 3. The spring 17 is weaker than the spring 10, in order not to disturb the inoperative position of the double-armed lever 7.

The downwardly directed arm of the double-armed lever 15 has at its free end a bent portion 20 which cooperates with the periphery of the abutment disk 12.

A recording head 21 is secured to a spring blade *13a* at the free of the recording arm 13. A diagram disk 28 is timely rotated by means of a clockwork (not shown) in conventional manner. The electromagnet 3 is excited for short time periods by means of current impulses, which are fed in known manner from an electrical switching device applied to the machine to be controlled, whereby the armature 4 and the double-armed lever 7 are subjected always, in response to each of the current impulses, to a swinging movement against the force of the spring 10 in counter-clockwise direction. Due to such movement, the pawl 9 moves into the next following tooth gap of the ratchet wheel 8 and is then pulled immediately thereafter against the abutment 11 by means of the spring 10, whereby the ratchet wheel 8 performs a switching step in clockwise direction. The double-armed lever 7 and the armature 4 return simultaneously to their original positions shown in FIG. 1 of the drawings. A spring lock 22 prevents a rotation of the ratchet wheel 8 in counter-clockwise direction during the movement of the pawl 9 in the same direction.

During the swinging movement of the double-armed lever 7 in counter-clockwise direction, the pin 18 follows the edge formation 19 of the double-armed lever 7 due to the effect of the force of the spring 17 on the double-armed lever 15, until the bent portion 20 engages the periphery of the abutment disk 12 and, thereby, terminates the swinging movement of the double-armed lever 15 and, thus, also of the recording arm 13. The double-armed lever 7 continues its movement, however, away from the pin 18 in counter-clockwise direction, so that a looseness of space is created between the edge formation 19 of the double-armed lever 7 and the pin 18 of the double-armed lever 15, as it is indicated in point-dotted lines in FIG. 1, as well as in FIG. 2, of the drawings. This space is large enough to limit the swinging movement of the double-armed lever 15 in clockwise direction always upon engagement of its bent portion 20 on the periphery of the abutment disk 12. As soon as the spring 10 becomes effective, upon rendering inoperative the electromagnet 3 and turning the double-armed lever 7 in clockwise direction, the edge formation 19 of the double-armed lever 7 engages again the pin 18, whereby the double-armed lever 15 is returned to its original, non-abutting position, shown in FIG. 1 of the drawing, against the force of the spring 17 in counter-clockwise direction, which movement is possible due to the fact that the spring 10 is stronger than the spring 17. A projection *15a*, extending from the double-armed lever 15 and cooperating with an immovable abutment 27 secured to the base plate 2 and receiving the other end of the spring 17, prevents an excessive swinging return movement of the double-armed lever 15.

The double-armed lever 15 is thus controlled during the operation of the electromagnet 3 in a cycle change by the double-armed lever 7 and the abutment disk 12, whereby the pin 18 of one of the arms and the bent portion 20 of the other of the arms of the double-armed lever 15 are spaced apart alternately from the edge portion 19 of the double-armed lever 7 and from the abutment disk 12, respectively. As long as the bent portion 20 of the double-armed lever 15 engages, during the operation of the electromagnet 3, the outermost peripheral section 29 of the abutment disk 12, the recording head 21 records the always relatively short line of equal height on the diagram disk 28. In case of corresponding longer operational periods of the electromagnet 3, the individual recordings are made in known manner in form of small rectangles.

In order to amplify a predetermined, for instance, a decadal multiple of the individual recordings, small cut-outs 23 are provided at predetermined equal distances on the abutment disk 12, which cut-outs 23 cause an additional length of the swinging stroke of the recording arm 13 and, thereby, of the recording of the lines 25, which extend beyond the lines standing for the remaining individual recordings. Furthermore, for instance, each fifth or tenth cut-out 24 is formed with a greater radial depth than the cut-out 23, in order to arrive at particularly longer recording lines 26, which further simplify the reading of the recordings.

The electromagnetic control of the recording arm 13 has been chosen in the embodiment disclosed in the drawings merely as one means for operation in accordance with the present invention and can be replaced by a pneumatic or any other operation performing the same function. It is also within the scope of the present invention that the amplification of predetermined multiples of individual recordings takes place on a plurality of circular lines having different radii or on a spiral line on the diagram disk 28. The switching device can be disposed for this purpose, in accordance with the present invention, together with the recording arm 13 on a movably mounted plate, which is accordingly adjusted by means of any known time-control mechanism.

Figure 5:
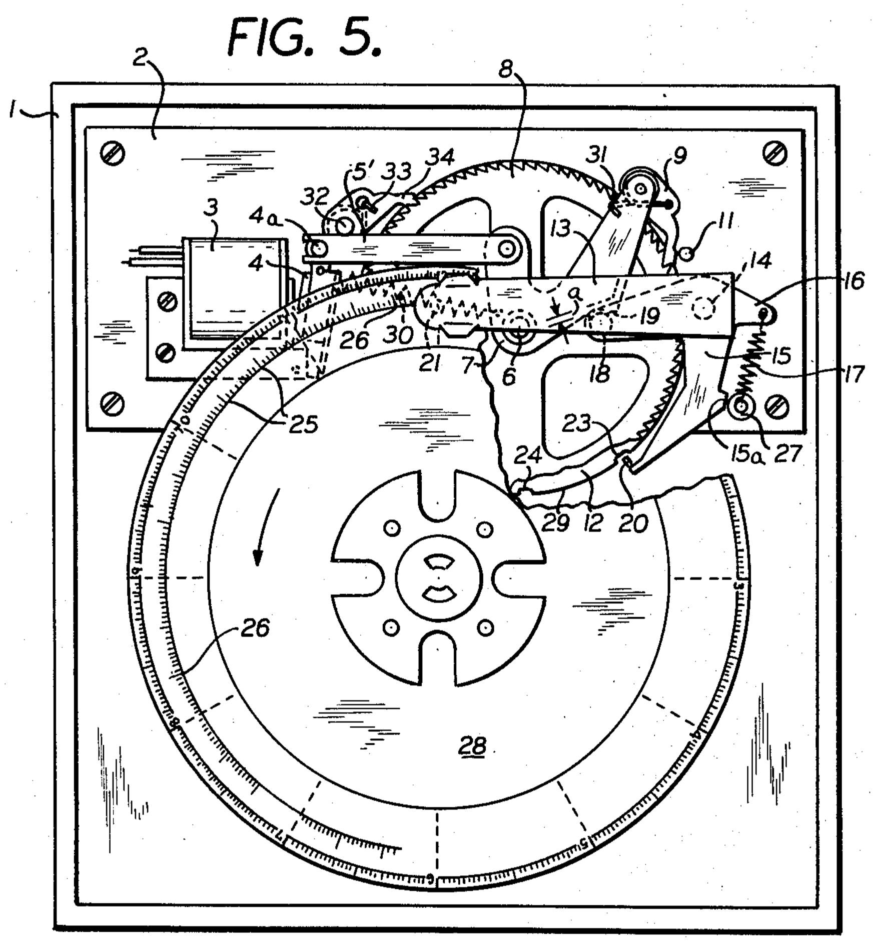
FIG. 5 is a front elevation of the recording instrument, disclosing another embodiment thereof, parts being broken away for the purpose of better demonstration.

Referring now again to the drawings, and in particular to FIG. 5, the embodiment disclosed therein comprises substantially the same elements and as far as it is identical with the embodiment of FIGS. 1 to 4, the description thereof does not require repetition.

The distinction of the embodiment of FIG. 5 resides in an arrangement according to which one end of the intermediate member 5′ is forked and loosely mounted on a bolt *4a* of the armature 4. A spring 30 is disposed between the armature 4 and the double-armed lever 7, the ends of the spring 30 being secured to the armature 4 and to one arm of the double-armed lever 7, respectively. Upon rendering operative the electromagnet 3, the armature 4 swings counter-clockwise and with a predetermined delay the double-armed lever 7 is likewise turned in counter-clockwise direction, so that the pawl 9 can move into the next tooth gap under the pressure of a torsion spring 31 secured thereto as well as to the corresponding arm of the double-armed lever 7. The spring 30 is stronger than the spring 17. The securing point of the spring 30 on the double-armed lever 7 is chosen such that, upon rendering inoperative the magnet 3, the spring 30 returns the armature 4, the intermediate member 5′, the double-armed lever 7 and the double-armed lever 15 into the original positions showns in FIG. 5 of the drawings, whereby the ratchet wheel 8 and the abutment disk 12 are turned clockwise for one step.

Figure 2:
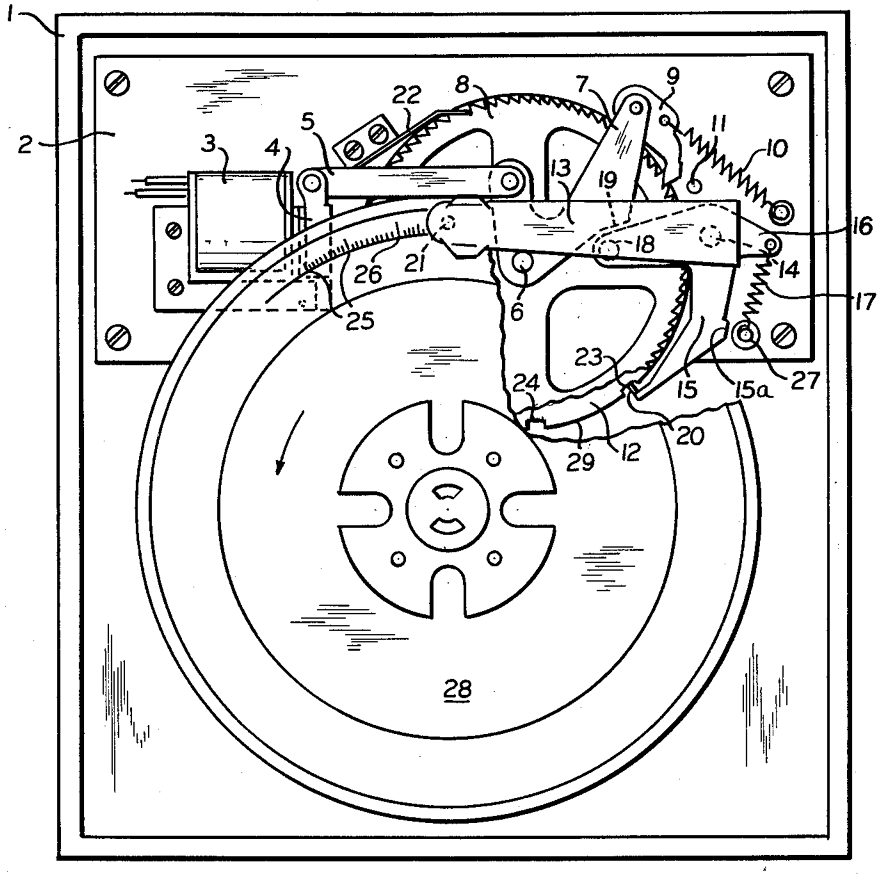
FIG. 2 is a front elevation of the recording instrument, as shown in FIG. 1, yet the electromagnet being shown in operative position, parts being broken away for the purpose of better demonstration.
Figure 3:
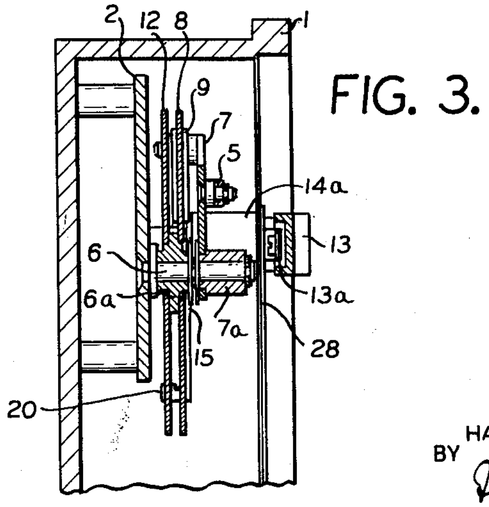
FIG. 3 is a section along the lines 3—3 of FIG. 1.
Figure 4:
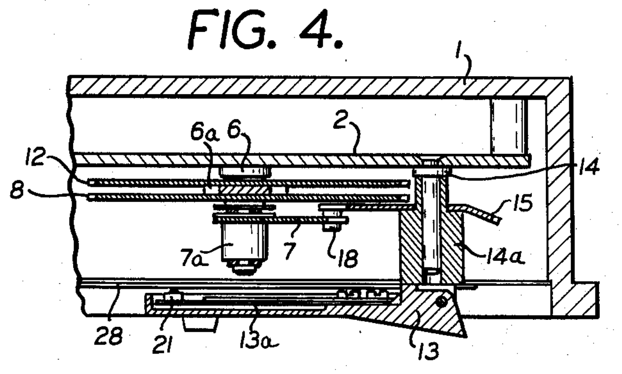
FIG. 4 is a section along the lines 4—4 of FIG. 1.

The locking spring 22 of the embodiment of FIG. 1 is replaced in the embodiment of FIG. 5 by a locking pawl 34 rotatably mounted about a bolt 32 secured to the base plate 2 and retained in engagement with the teeth of the ratchet wheel 8 by means of a torsion spring 33 secured to and urging the locking pawl 34 into such engaging position. By these structural arrangements, the function of the switching mechanism is improved and the life of the instrument is extended.

While I have disclosed two embodiments of the present invention, it is to be understood that these embodiments are given by example only and not in a limiting sense, the scope of the present invention being determined by the objects and the claims.

I claim:

1. An instrument for recording of strokes performed in cycles or numbers of manufactured pieces of working machines, comprising a housing, a base plate mounted in said housing, a time-responsive rotating diagram disk rotatably mounted in said housing, a recording arm pivotally secured to said base plate and having a recording head disposed opposite said diagram disk for working recordings on said diagram disk, operating means including lever members operatively connected with and directly moving said recording arm and causing a swinging movement of the latter in response to impulses fed to said operating means, abutment means for limiting the swinging movements of said recording arm and including an abutment disk rotatably mounted on said base plate for step-wise advancing movements by said lever members and coordinated to the swinging movement of said recording arm, said abutment disk having a plurality of cut-outs at its periphery equally spaced apart at predetermined multiples of said swinging movements of said recording arm, said recording arm having a complementary member engaging the periphery of said abutment disk and said cut-outs of said abutment disk, respectively, said operating means comprising an electromagnet and an armature cooperating therewith, and said lever members comprise a double-armed lever pivotally mounted on said base plate on an axis disposed parallel to the rotating axis of said abutment disk, as well as an intermediate member having a forked portion at one end thereof for loose engagement with said armature and a pivot at the other end thereof for pivotal connection with one arm of said double-armed lever, a ratchet wheel secured to said abutment disk for joint rotation therewith, means connected with the other arm of said double-armed lever for controlling the swinging movements of said recording arm so that said double-armed lever with said intermediate member and said controlling means provide the operative connection of said operating means with said recording arm, said controlling means including a pawl pivotally secured to said other arm of said double-armed lever and cooperating with said ratchet wheel, first spring means secured to said pawl and said other arm of said double-armed lever and urging said pawl into engagement with said ratchet wheel, and second spring means secured to said one arm of said double-armed lever and said armature and urging the latter from its operative into its inoperative position, so that said double-armed lever causes a step-wise movement of said ratchet wheel and of said abutment disk in response to the operative cycles of said electromagnet.

2. The instrument, as set forth in claim 1, wherein said abutment disk has additional cut-outs, and said first mentioned cut-outs of said abutment disks are of a radial depth greater than that of said additional cut-outs corresponding to said swinging movements of said recording arm, in order to simplify further the reading of said marking recordings.

3. An instrument for recording of strokes performed in cycles or numbers of manufactured pieces of working machines, comprising a housing, a base plate mounted in said housing, a time-responsive rotating diagram disk rotatably mounted in said housing, a recording arm pivotally secured to said base plate and having a recording head disposed opposite said diagram disk for working recordings on said diagram disk, operating means including lever members operatively connected with and directly moving said recording arm and causing a swinging movement of the latter in response to impulses fed to said operating means, abutment means for limiting the swinging movements of said recording arm and including an abutment disk rotatably mounted on said base plate for stepwise advancing movements by said lever members and coordinated to the swinging movement of said recording arm, said abutment disk having a plurality of cutouts at its periphery equally spaced apart at predetermined multiples of said swinging movements of said recording arm, said recording arm having a complementary member engaging the periphery of said abutment disk and said cut-outs of said abutment disk, respectively, said operating means comprising an electromagnet and an armature cooperating therewith, and said lever members comprise a double-armed lever pivotally mounted on said base plate on an axis disposed parallel to the rotating axis of said abutment disk, as well as an intermediate member operatively connecting and said armature with one arm of said double-armed lever, a ratchet wheel secured to said abutment disk for joint rotation therewith, means connected with the other arm of said double-armed lever for controlling the swinging movements of said recording arm, so that said double-armed lever with said intermediate member and said controlling means provide the operative connection of said operating means with said recording arm, said controlling means including a pawl pivotally secured to said other arm of said double-armed lever and cooperating with said ratchet wheel, spring means secured to said pawl and urging the latter into engagement with said ratchet wheel and said double-armed lever from its operative position into its inoperative position, so that said double-armed lever causes a stepwise movement of said ratchet wheel and of said abutment disk in response to the operative cycles of said electromaget.

4. The instrument, as set forth in claim 3, wherein said means controlling the swinging movements of said recording arm comprises a second double-armed lever rigidly secured to said recording arm for a joint swinging movement therewith, spring means operatively connected with said second double-armed lever and urging one arm of the latter into abutting position with said first mentioned double-armed lever during the inoperative position of said electromagnet and during a part of the swinging movement of said first mentioned double-armed lever in the operative position of said electromagnet, and also urging the other arm of said second double-armed lever into abutting position with the periphery of said abutment disk, and said first mentioned double-armed lever continuing its swinging movement without said second double-armed lever after said second double-armed lever has reached its abutment position on said abutment disk, so that said arms of said second double-armed lever are alternately spaced apart from said first double-armed lever and from said abutment disk, respectively.

References Cited by the Examiner

UNITED STATES PATENTS

| | | | |
|---|---|---|---|
| 831,030 | 9/06 | Berry | 346—33 |
| 1,188,329 | 6/16 | Schaefer | 346—121 |
| 1,205,353 | 11/16 | Jones | 346—71 |
| 1,206,040 | 11/16 | Simpson | 346—139 X |
| 1,707,356 | 4/29 | Roy et al. | 346—102 X |

LEO SMILOW, *Primary Examiner.*